United States Patent Office 3,267,044
Patented August 16, 1966

3,267,044
PROCESS FOR PREPARING A SILICA-ALUMINA-MAGNESIA CRACKING CATALYST
Charles P. Wilson, Jr., Cincinnati, Ohio, John B. Jones, Valley Field, Quebec, Canada, and Frank G. Ciapetta, Silver Spring, Md., assignors to W. R. Grace & Co., New York, N.Y., a corporation of Connecticut
No Drawing. Filed Nov. 23, 1962, Ser. No. 239,770
10 Claims. (Cl. 252—451)

This invention relates to a method of preparing a catalyst containing silica, alumina and magnesia. In one particular aspect, it relates to a method of preparing a silica-alumina-magnesia catalyst wherein the silica is present in about 72 to 86%, the alumina is about 14 to 28% of the silica-alumina component, and the magnesia in about 2 to 10% of the final catalyst.

It is well known that in catalytic cracking of petroleum, a catalyst composed of silica-magnesia as compared to silica-alumina, can be expected to give a higher yield of gasoline and furnace oil with a lower yield of coke, light gases and residual fuels. Although the octane number of the gasoline is lower, the B.t.u. values of the jet fuels, furnace oil or other products of the cracking process are higher for the silica-magnesia catalyst.

One of the problems encountered in silica-magnesia catalysts is that when they are used for cracking hydrocarbon oils, they become deactivated due to the formation of carbon on the catalyst. It is then necessary to regenerate the deactivated catalyst by burning off the carbon. The major obstacle for widespread application of the silica-magnesia catalyst has been the fact that carbon cannot adequately removed during the catalyst regeneration step.

In view of the wide differences in catalytic properties of the silica-alumina and the silica-magnesia catalysts, it is obvious that a catalyst with properties which would enable the refiner to recover products in the intermediate range between the products normally recovered from a silica-alumina catalyst on the one hand or a silica-magnesia catalyst on the other would be attractive to petroleum refiners.

A novel process is herein disclosed by which catalysts with such intermediate properties can be prepared. The variations in the catalytic properties are accomplished by varying the amount of alumina in the silica-alumina base and by varying the amount of magnesia incorporated into the base. The silica-alumina base contains about 14 to about 28% alumina and about 72 to about 86% silica. In the absence of magnesia, this catalyst is known as the "high alumina type" as opposed to the "low alumina type" which contains less than 14% alumina.

There are several prior art processes for preparing cracking catalysts containing silica, alumina, and magnesia as components. In the majority of these processes, a silica hydrogel base is first prepared by gelatin of a dilute sodium silicate solution with a mineral acid such as sulfuric acid. Sufficient aluminum sulfate solution is then added to give the desired amount of alumina in the final product. The alumina is precipitated from the alum (aluminum sulfate) into the silica hydrogel by the addition of an alkaline solution such as ammonia. The magnesia component is generally the final component added to prepare the catalyst. The magnesia is added as calcined magnesium oxide or hydrated magnesia. This process is the one principally used since the co-gelation of magnesium silicate by adding magnesium sulfate to sodium silicate or vice versa results in a product that is too soft for use as a cracking catalyst.

The prior art processes have several shortcomings. One of the most important is that the use of the relatively large quantity of ammonia required to precipitate alumina introduces ammonium sulfate into the system into which magnesium oxide or the magnesium hydrate or the hydroxide are to be subsequently added. This is objectionable because of the solubility of the magnesium products in the solution of ammonium salts. Thus, it is obvious that in the use of the prior art process, it would be very difficult to retain the magnesia in the catalyst.

The alternate process in which alkaline magnesia is added to a low pH mixture of alum and silica hydrogel which is derived from the acid gelation of sodium silicate leads to an excessive loss of magnesia in the absence of a pH adjustment by ammonia or other alkaline material. Additionally, these processing steps tend to bind the soda and sulfate in such a manner as to prevent their ready removal in the catalyst washing step.

In copending application, S.N. 223,551 filed September 13, 1962, we have disclosed a process for preparing a silica-alumina-magnesia catalyst which is superior to the catalysts prepared by prior art processes. The composition of this catalyst is about 86.5% silica and 13.5% alumina as the base along with about 2 to 8% magnesia to complete the catalyst.

Briefly the process covered in our copending application comprises preparing a dilute sodium silicate solution, gelling the solution with carbon dioxide, adding aluminum sulfate in an amount sufficient to neutralize the sodium hydroxide in the sodium silicate and prepare a catalyst containing about 13.5% alumina, adding magnesia either in the hydrated or unhydrated form, hot aging, followed by spray drying, washing and finally recovering the catalyst product.

We now have discovered a process for preparing a "high alumina type" silica-alumina-magnesia catalyst. The essential feature of our new process consists of reducing the mol ratio of sulfate to alumina below 3.0:1.0 but no lower than 1.5:1.0.

In essence, our novel process comprises preparing a sodium silicate solution to contain the desired silica in the final catalyst, gelling the solution with carbon dioxide, adding an aluminous slurry (defined below) to produce up to about 30% alumina in the final catalyst, adding calcined magnesia, hot aging, followed by spray drying, washing, the catalyst to remove salts and finally recovering the catalyst product.

Our process provides great flexibility in that a greater variety of products with an accompanying variety of properties in relation to hydrocarbon conversion can be produced than by prior art processes. There is a significant improvement in the steam stability of the products of this invention as compared to catalysts prepared by other methods. The improvements are accomplished through the processing steps outlined above which also greatly reduce the costs of manufacturing the product.

In the first step of our process, a diluted sodium silicate solution is gelled with carbon dioxide ($CO_2$) in gaseous form. The carbon dioxide converts the alkali in the sodium silicate to sodium carbonate and bicarbonate. The $SiO_2$ content of the diluted silicate solution can be about 3 to about 8% but the preferred range is about 4.5 to about 6.5%.

The high alumina content in our catalyst is provided by a reduction of the mol ratio of $SO_4$ to $Al_2O_3$ to below 3:0:1 but no less than 1.5:1.0. There are several ways to accomplish this.

In normal aluminum sulfate, $Al_2(SO_4)_3$, the mol ratio of $SO_4$ to $Al_2O_3$ is 3.0:1.0. The aluminous slurries employed in our process for the purpose of reducing the mol ratio of $SO_4$ to $Al_2O_3$ are composed of mixtures of aluminous salts and free alumina hydrate. Our slurries can be prepared to yield a mol ratio of $SO_4$ to $Al_2O_3$ from just below 3.0:1.0 down to 1.5:1.0. To insure a final product of satisfactory quality, we prefer not to reduce the ratio of $SO_4$ to $Al_2O_3$ to less than 1.5:1.0.

For economic reasons, sulfuric acid has been employed in preparing our aluminous slurries. For purposes of simplicity, its use is referred to in the description of this invention although other mineral acids are equally effective.

Several variations in processing procedure are available for preparing our aluminous slurries.

One method is to directly react alumina trihydrate with less than the amount of sulfuric acid required to give 3.0:1.0 mol ratio of $SO_4$ to $Al_2O_3$. The hydrate may be added to dilute sulfuric acid or equally effective results obtained by adding strong sulfuric acid to a water slurry of the hydrate. In both cases, temperatures, dilution, and time of digestion are controlled to promote the desired reactions and also avoid lumping or solidification.

Another method of preparing the slurry is to react the alumina hydrate with a quantity of sulfuric acid to provide the 3.0:1.0 mol ratio found in normal aluminum sulfate. After the reaction has proceeded to completion, an amount of alumina hydrate is added to give the desired reduction in mol ratio.

The aluminous slurry then is added and the carbon dioxide contained in the carbonates present in the hydrogel mixture is released and can be recycled in a continuous system for gelation of fresh incoming sodium silicate. Concurrent with the release of carbon dioxide from the sodium compounds, the soluble alumina is precipitated from the aluminous slurry. This precipitation is complete in the process of our invention because the amount of soluble alumina in the slurry is equivalent to the $Na_2O$ derived from the sodium silicate. In turn, the $CO_2$ released by evolution for recycle is stoichiometrically equivalent to 100% of the $Na_2O$ contained in the sodium silicate.

An alternate method for reducing the mol ratio of $SO_4$ to $Al_2O_3$ involves a slight change in the order of the process steps.

In this method, alumina trihydrate is added to the sodium silicate prior to gelling with carbon dioxide.

After gelling, an amount of normal alum (having a mol ratio of $SO_4$ to $Al_2O_3$ of 3 to 1) equivalent to the alkali contained in the silicate is added to the hydrogel.

The amount of alumina trihydrate added before gelling is determined to give the desired reduction in mol ratio of $SO_4$ to $Al_2O_3$ below 3.0 to 1.0 which is present in the normal alum. The addition of the alumina trihydrate can be in amounts up to but not exceeding the amount of alumina subsequently added as normal alum solution.

Certain limitations must be placed on the chemical purity and physical properties of the alumina trihydrate added at any stage in the process in order to safeguard the quality of the final product.

The undesirable chemical impurities found in commercially available alumina hydrates are sodium, iron, silica and insoluble matter (this referring to material that is insoluble in relatively concentrated mineral acids).

The soda impurity introduced into our process in chemical combination with the sodium silicate raw material is readily removed by known washing procedures. However, the soda found in the commercial alumina hydrates is an insoluble form which cannot be removed by washing. Therefore the following tolerances are specified for the chemical impurities contained in alumina hydrates suitable for use in the unreacted state in our process.

| | Percent maximum |
|---|---|
| Soda as $Na_2O$ | 0.30 |
| Iron as Fe | 0.005 |
| Silica as $SiO_2$ | 0.01 |

The particle size of the hydrate is also critical. The hydrate should be selected so that a maximum passes through a 325 mesh screen and a minimum is retained on a 100 mesh screen. However, hydrate having particle sizes such that up to 5% is retained on a 100 mesh screen and not more than 50% is retained on a 200 mesh screen can be used in the process of our invention.

Our process affords another important technical advance in that we can eliminate the acid required for gelation of the sodium silicate and the alkali required to precipitate the alumina.

The use of sulfuric acid or any other strong mineral acid in a gelation process is undesirable because of the costly equipment and the necessary safety and health precautions that must be followed when the corrosive liquid is being handled in the chemical process.

Equally important is the elimination of the use of ammonia in the process of our invention. Ammonia is the standard precipitant in these processes for several reasons, principally because ammonia is a gas and thus is easier to handle and in addition, because the use of ammonia does not entail the addition of sodium to the system.

Ammonia, however, is undesirable in chemical processes because it presents handling and health hazards to the employees of the plant and because of the undesirable air pollution that results from the escape of a certain amount of ammonia to the atmosphere from the processing equipment.

The elimination of both the sulfuric acid and the ammonia normally used in the preparation of silica-alumina-magnesia catalysts is accomplished because the ratio of silica to sodium oxide and to sodium silicate is kept in careful balance with the alum added which furnished part of the alumina content of the product. The alkali available for 100% precipitation of this alumina and the $CO_2$ evolved for gelation is found in the grades of sodium silicate which are most practical and economical to manufacture commercially. The weight ratio of the silica to soda in this product is about 3.25 to 3.35 silica to 1 sodium oxide. The alumina trihydrate added to increase the alumina content of our product does not require precipitation.

Thus briefly summarizing the first step of our process, concentrated sodium silicate solution containing about 28.5% $SiO_2$ and having a weight ratio of about 3 to 3.4 and preferably 3.25 to 3.35 silica to 1 sodium oxide is diluted to a silica content of about 3 to 8% and preferably about 4.5 to 6.5%. The sodium silicate is gelled by adding gaseous carbon dioxide at a temperature up to about 165° F.

In the next step, sufficient aluminous slurry is added to provide a final catalyst containing any desired amount between about 14 and about 28% alumina in the silica-alumina component. The acidic ion introduced from the aluminous slurry is just sufficient, under the circumstances, to neutralize all the alkali originating from the sodium silicate which is then converted by carbon dioxide gelation to sodium carbonate.

The gaseous $CO_2$ released from the system by the acidic ion in this step is recovered and recycled for co-gelation of incoming sodium silicate.

After the silica-alumina base has ben prepared, a predetermined amount of calcined magnesium oxide or hydrated magnesia is added. The magnesia is added in a quantity sufficient to provide about 2 to about 10% magnesium in the final catalyst. We specify a maximum of 10% magnesium oxide content for our catalyst. We have found that an excess of magnesia, unlike an excess of $Al_2O_3$, has an adverse effect on the stability of the catalyst at temperatures above 1350° F. In the examples included in the instant application, light burned magnesia derived from sea water has been employed. Our process is not limited to this specific grade of calcined or hydrated magnesia. An active catalytic product can also be produced from magnesium hydroxide precipitated from a soluble magnesium salt.

The silica gel-alumina-magnesia slurry is then aged at a temperature of at least 125° F., but preferably about 150–180° F. for the period of time required to effect the desired degree of combination between the active constituents. This time varies from about 1 to 5 hours although consistently good results are generally obtained when the aging is continued for about 2–4 hours.

The aging step is very important in the process of our invention. The pore volume and attrition characteristics and to a lesser extent, the surface area and activity of final catalyst are affected by the time and temperature of the aging step.

After the hot aging is completed, the slurry is filtered to remove a maximum of free water and water soluble salts. The salts are principally sodium sulfate.

The filter cake is recovered and then reslurried with a minimum quantity of water to prepare a viscous but pumpable slurry which is then spray dried.

After spray drying, the product is washed free of soda and sulfate impurities by using 2° Bé. ammonium sulfate solution. The washing is carried out a temperature of about 100–130° F. and with the pH of the wash water adjusted between 8.0 to 9.0 with ammonium hydroxide. This rinse is followed by a rinse with deionized water, again at a temperature of about 100–130° F. and a pH of about 9 to 9.5. The washed catalyst product is finally dried at 300° F.

There are several alternate procedures for preparing the spray drier fed slurry.

One procedure is to filter the silica hydrogel-alumina base, then reslurry the recovered filter cake with the magnesia followed by hot aging, spray drying and washing as described above.

Another method is to wash or partially wash the silica hydrogel-alumina base during the filtration step, after which the recovered filter cake is reslurried with magnesia, hot aged, and finally spray dried. If soda and sulfate washing is completed during filtration, then the spray drying becomes the final step in the process.

Our invention will be further explained by the following specific but non-limiting examples:

EXAMPLE I

The preparation of a high alumina base silica-alumina-magnesia catalyst prepared with an aluminous slurry is described here.

An aluminous slurry having a 1.5 to 1 mol ratio of $SO_4$ to $Al_2O_3$ was prepared as follows:

7,850 cc. of normal alum solution was prepared by reacting 1232 grams of alumina hydrate with 2,430 grams of sulfuric acid then diluting with water so that the solution contained 102 grams/liter $Al_2O_3$ and 16.3 grams/liter excess $H_2SO_4$ over that combined with the alumina.

To this alum solution was added 1,232 grams of alumina trihydrate.

The alumina trihydrate used had the following specifications:

| Chemical: | Percent |
|---|---|
| $Al_2O_3$ | 64.9 |
| $SiO_2$ | 0.008 |
| $Fe_2O_3$ | 0.003 |
| $Na_2O$ | 0.20 |

| Screen analysis: | Percent |
|---|---|
| On 100 mesh | 0–2 |
| On 200 mesh | 0–10 |
| On 325 mesh | 25–50 |
| Through 325 mesh | 50–75 |

| | Density, lbs./ft.$^3$ |
|---|---|
| Loose | 60–70 |
| Packed | 75–85 |

Silica gel was prepared by adding $CO_2$ to 20 gallons of a dilue sodium silicate solution containing 20.5 grams/liter $Na_2O$ and 67.6 grams/liter $SiO_2$. $CO_2$ was added for about 5 minutes until gelation occurred. The pH at gelation was 10.1. The $CO_2$ addition was continued until the pH reached 9.7.

The aluminous slurry previously prepared was then added to the silca gel. The resulting mixture, at pH 5.0, was stirred for 10 minutes and then a 915 gram quantity of calcined MgO was added. The temperature was raised to 180° F. and the material aged for four hours.

After aging, the mixture was filtered. The 60 pound filter cake was reslurried with 3 liters of water and then spray dried.

The spray dried material was washed in lots of 3,000 grams each with 15 liters of distilled water adjusted to a pH of 9.0 and at a temperature of 130° F. Each lot was then washed three times with a 2° Bé. solution of $(NH_4)_2 SO_4$ at 130° F. and a pH of 9.0, using 15 liters for each wash. Finally, each lot was again washed with three 15 liter portions of distilled water at 9.0 pH and 130° F.

The product was then dried at 300° F. to the desired water content of about 15%.

The properties of this catalyst are tabulated in Table I (below) along with those of the products prepared according to the other examples of this invention.

EXAMPLE II

In this example, the product is prepared using the alternate method for lowering the mol ratio of $SO_4$ to $Al_2O_3$, i.e., adding alumina trihydrate to the silicate solution before gelling.

Twenty gallons of a dilute sodium silicate solution were placed in a 30 gallon capacity tank which was jacketed for heating with hot water and supplied with an agitator and a circulating centrifugal pump. The silicate solution contained 20 grams/liter of $Na_2O$ and 66 grams/liter $SiO_2$.

A 1,232 gram quantity of alumina trihydrate was then added to the silicate solution while constantly agitating the mix. The alumina trihydrate had the same analysis as that used in Example I. The temperature of the mixture was raised to 85° F. and then gaseous $CO_2$ passed in for about 6 minutes until gelation occurred. The $CO_2$ treatment was continued until the pH of the mix was 9.7. The mixture was maintained at 85° F. and aged for thirty minutes.

8.9 liters of normal alum solution (3 to 1 mol ratio of $SO_4$ to $Al_2O_3$) were prepared by reacting 1,232 grams of alumina hydrate with 2,430 grams of sulfuric acid then diluting with water so that the solution contained 90 grams/liter $Al_2O_3$ and 16.3 grams/liter excess $H_2SO_4$.

After aging the silica gel, the alum solution was added to it with agitation until the pH of the mixture reached 5.6. At this pH, the dissolved alumina in the alum precipitated. The silica-alumina mix was stirred for 10 minutes and then 915 grams of calcined magnesia were added.

This slurry was then aged for 4 hours at 180° F. The final pH of the aged slurry was 8.3.

The aged slurry was then filtered and the filter cake recovered.

45 pounds of the filter cake were mulled with 2.2 liters of water and then spray dried. The spray dried material was washed in 3,000 gram lots with 15 liters of deionized water at 130° F. and 9.0 pH. Each lot was then washed with three 15 liter portions of 2° Bé. $(NH_4)_2 SO_4$ at 130° F. and 9.0 pH.

Finally each lot was washed again with three 15 liter portions of deionized water at 130° F. and 9.0 pH.

The product was then dried at 300° F. to the desired water content of about 15%.

The properties of the catalyst are tabulated in Table I below.

EXAMPLE III

This example describes the preparation of the low alumina base catalyst.

Twenty gallons of a dilute sodium silicate solution containing 20.5 grams/liter $Na_2O$ and 67.6 grams/liter $SiO_2$ were prepared. This solution was heated to 85° F. and then $CO_2$ added until gelation occurred at a pH of 10.1. The $CO_2$ treatment was continued for thirty minutes until the pH reached 9.6. 7,850 cc. of normal alum containing 102 grams/liter $Al_2O_3$ and 16.3 grams/liter excess $H_2SO_4$ over that combined with the alumina were prepared by reacting 1,232 grams of alumina hydrate with 2,430 grams of sulfuric acid and diluting with water to the desired 102 grams/liter $Al_2O_3$ content. The pH of the mixture was then 5.0. The silica-alumina mixture was stirred for about 10 minutes and then 915 grams of calcined magnesia added to it. The temperature of the slurry was raised to 180° F. and maintained at that temperature for 4 hours. After aging, the mixture was filtered, the cake reslurried with 3 liters of water and then spray dried. The spray dried material was washed in 3,000 gram lots with three 15 liter washes of deionized water at 130° F. and 9.0 pH.

Each lot was then washed with three 15 liter washes of 2° Bé. $(NH_4)_2SO_4$ at 130° F. The material was then washed again with three 15 liter portions of deionized water at 130° F. and 9.0 pH.

The product was then dried at 300° F. to the desired water content of about 15%.

Properties of the product are tabulated in Table I below.

EXAMPLE IV

In this run, the magnesia content of the catalyst was increased to 14.61%.

Twenty gallons of dilute sodium silicate solution containing 20.7 grams/liter $Na_2O$ and 68.3 grams/liter $SiO_2$ were prepared. The solution was heated to 85° F. and then treated with gaseous $CO_2$ until gelation occurred in about 8 minutes at a pH of 10.2. The $CO_2$ treatment was then continued for about 30 minutes until the pH reached 9.65. The temperature was maintained at 85° F.

7,850 cc. of normal alum containing 102 grams/liter $Al_2O_3$ were prepared by reacting 1,232 grams of alumina hydrate with 2,430 grams of sulfuric acid then diluting with water to desired $Al_2O_3$ content.

This was then added to the silica gel with agitation. The mixture had a final pH of 5.0. It was mixed for about 10 minutes and then 1,830 grams of calcined magnesia added to it. The temperature of the mixture was raised to 180° F. and maintained for 4 hours.

After aging the material was filtered, spray dried, washed and dried as described in the previous examples.

The properties of the product are tabulated in Table I below.

TABLE I

|  | Catalyst of Ex. I | Catalyst of Ex. II | Catalyst of Ex. III | Catalyst of Ex. IV |
|---|---|---|---|---|
| Percent $SiO_2$ | 68.20 | 69.26 | 79.13 | 73.10 |
| $Al_2O_3$ | 23.77 | 21.63 | 13.09 | 11.96 |
| MgO | 7.27 | 8.47 | 7.11 | 14.61 |
| $Na_2O$ | 0.053 | 0.051 | 0.046 | 0.023 |
| $SO_4$ | 0.63 | 0.54 | 0.57 | 0.24 |
| Fe | 0.08 | 0.047 | 0.049 | 0.068 |
| After heating product 3 hours at 1,000° F.: |  |  |  |  |
| Surface Area (m.²/g.) | 446 | 437 | 477 | 524 |
| Pore Volume (cc./g.)— |  |  |  |  |
| Nitrogen | .63 | .58 | .65 | .64 |
| Water | .65 | .63 | .69 | .68 |
| Attrition | 17.0 | 17.7 | 12.3 | 14.7 |
| Cracking activity and selectivity: |  |  |  |  |
| Steam D+L | 33.1 | 32.3 | 30.5 | 36.7 |
| G.P.F.[1] | 1.08 | 1.04 | 1.05 | 1.06 |
| C.P.F.[2] | 1.02 | 0.84 | 1.10 | 1.08 |
| After heating product 3 hours at 1,550° F.: |  |  |  |  |
| 1,550° D+L | 39.9 | 43.6 | 43.1 | 9.9 |
| G.P.F.[1] | 0.95 | 0.91 | 0.94 | 1.36 |
| C.P.F.[2] | 1.17 | 0.87 | 0.83 | 1.62 |

[1] G.P.F.—Denotes Gas Producing Factor.
[2] C.P.F.—Denotes Carbon Producing Factor.

The physical and chemical properties of the catalysts set forth in Table I were determined by standard methods.

Surface area and pore volume of the products were determined by nitrogen adsorption measurements according to the well-known Brunauer-Emmett-Teller (B.E.T.) Method. The method is fully described in J. Am. Chem. Soc., 60, 309 (1938). The values shown in Table I were determined after the catalysts had been heated in a muffle furnace for three hours at 1000° F.

The attrition index was obtained by subjecting the catalyst to a high velocity air jet according to the standard Roller procedure. The weight of minus 20 micron particles formed during the test is measured as a criterion of the resistance of the catalyst to interparticle attrition. The index is obtained by the formula $$\frac{100(A-B)}{C}$$

Where $A$=0–20 micron content in grams of calcined catalyst after attrition;
$B$=0–20 micron content in grams of calcined catalyst before attrition;
$C$=plus 20 micron content in grams of calcined catalyst before attrition.

A complete description of the procedure can be found in Petrol. Refiner 30, No. 6, 99–130; No. 7, 141–145; No. 9, 127–132 (1951).

The catalytic cracking activity, stability and selectivity of the catalysts were determined as follows.

*Cracking activity after steam deactivated or steam D+L*

A sample of catalyst was compressed into pellets. The pellets were deactivated by heating for five hours at 400° F., three hours at 1050° F. without steam, then 24 hours at 1050° F. in an atmosphere of steam at 60 p.s.i.g.

200 ml. of the deactivated catalyst were then placed in a reactor and maintained at a temperature of 850° F.

During a two hour period, 238.2 ml. of virgin East Texas light gas oil were passed through the hot catalyst and the cracked products recovered and separated. The fraction which distilled below 400° F., as well as gas and loss, were determined and designated as the distillate plus loss, or more simply, $D+L$.

*Cracking activity after deactivation at 1550° F. or 1550° F. thermal D+L.*

A sample of the fresh catalyst was formed into pellets, then heated for five hours at 400° F., three hours at 1000° F., and finally three hours at 1550° F. The cracking activity was then determined by the same procedure employed for the steam $D+L$.

The gas and carbon produced by the catalyst in the various cracking tests described above was determined. The values assigned as "gas producing factor" and "carbon producing factor" or simply G.P.F. and C.P.F. are the relative amounts of gas and carbon produced by the catalyst being tested in comparison with a standard reference catalyst at the same activity level. A full description of this method can be found in Petrol. Refiner, 31, No. 6, 93–100 (1952).

From a review of the data shown in Table I, it can be seen that the catalyst of the instant invention, as described in Example I and II, has superior cracking activity after severe steam deactivation to prior art catalysts of Examples III and IV.

These data also show that catalysts of Examples I and II containing up to 8.47% MgO possess satisfactory thermal stability as measured by the cracking activity after heating to 1550° F. The 9.9 $D+L$ after 1550° F. treatment shown for catalyst IV indicates very poor thermal stability. This has been established to be due to the higher MgO content of 14.6%.

We claim:

1. A process for preparing a silica-alumina-magnesia hydrocarbon cracking catalyst which comprises providing a slurried mass consisting of an alkali metal silicate solution having a silica content of 3 to 8% and a silica to alkali metal oxide weight ratio of about 3:1 to 3.4:1, contacting the silicate solution with carbon dioxide in an amount sufficient to convert substantially all of the alkali in the silicate to alkali metal carbonate and form a silica hydrogel containing dissolved carbonate, combining with the resulting mass an aqueous slurry containing a mixture of an aluminum salt and alumina trihydrate in an amount sufficient to react substantially completely with the residual alkali metal carbonate and provide 14 to 28% alumina in the final catalyst composition, adding a quantity of a mangnesium compound selected from the group consisting of magnesium oxide and magnesium hydroxide sufficient to provide about 2 to 10% magnesia in the final catalyst, aging the resulting mass at a temperature of at least 125° F. for about 1 to 5 hours, purifying and drying the resulting composite and recovering the catalyst product.

2. The process according to claim 1 wherein the alkali metal silicate is sodium silicate.

3. A process according to claim 1 wherein the aqueous slurry contains a mixture of aluminum sulfate and alumina trihydrate in which the mol ratio of $SO_4$ to $Al_2O_3$ is less than 3.0:1.0 but no less than 1.5:1.0.

4. A process according to claim 1 wherein the magnesium compound is calcined magnesium oxide.

5. A process according to claim 1 wherein the magnesium compound is hydrated magnesium oxide.

6. A process according to claim 1 wherein the magnesium compound is magnesium hydroxide precipitated from a magnesium salt.

7. A process for preparing a silica-alumina-magnesia hydrocarbon cracking catalyst which comprises providing an aqueous sodium silicate solution having a silica content of 3 to 8% and a silica to soda weight ratio of about 3 to 1 to 3.4 to 1, heating to a temperature of up to 165° F., contacting the silicate solution with carbon dioxide in an amount sufficient to form a silica hydrogel and convert substantially all of the soda in the silicate to sodium carbonate, aging the resulting mass up to 2 hours, adding an aqueous slurry containing a mixture of aluminum sulfate and alumina trihydrate in which the mol ratio of $SO_4$ to $Al_2O_3$ is less than 3.0:1.0 but no less than 1.5:1.0 in a sufficient quantity to react substantially completely with the residual sodium carbonate and to provide about 14 to 28% alumina in the final catalyst composition, adding a magnesium compound selected from the group consisting of magnesium oxide and magnesium hydroxide in an amount to provide 2 to 10% magnesia in the final catalyst aging the resulting mass at a temperature between about 150–180° F. for 2 to 4 hours, filtering the composite, reslurrying the solids with water, spray drying the slurry, washing and redrying the resulting particles and recovering the catalyst product.

8. A process according to claim 7 wherein the spray dried solids are washed first with a dilute ammonium sulfate solution, rinsed with deionized water and then dried.

9. A process for preparing a silica-alumina-magnesia hydrocarbon cracking catalyst which comprises providing an aqueous sodium silicate solution having a silica content of 3 to 8% and a silica to soda weight ratio of about 3 to 1 to 3.4 to 1, adding alumina trihydrate to the solution in amounts up to but not exceeding the amount of alumina subsequently added in the form of aluminum sulfate, heating the mixture to a temperature up to 165° F., contacting the silicate-alumina hydrate mixture with carbon dioxide in an amount suffcient to convert substantially all of the soda in the silicate to sodium carbonate, aging the resulting mass up to 2 hours, adding an aqueous solution of aluminum sulfate in an amount sufficient to react substantially completely with the residual sodium carbonate and to provide, in combination with the alumina trihydrate previously added, 14 to 28% alumina in the final catalyst composition and thereby precipitate the aluminum sulfate as alumina, adding a magnesium compound selected from the group consisting of magnesium oxide and magnesium hydroxide in an amount sufficient to provide about 2 to 10% magnesia in the final catalyst, aging the resulting mass at a temperature between about 150 and 180° F. for about 2 to 4 hours, filtering the composite, reslurrying the solids with water, spray drying the slurry, washing and redrying the resulting solids and recovering the catalyst product.

10. A process according to claim 9 wherein the spray dried solids are washed first with a dilute ammonium sulfate solution, rinsed with deionized water and then dried.

References Cited by the Examiner

UNITED STATES PATENTS

| | | | |
|---|---|---|---|
| 2,326,706 | 8/1943 | Thomas et al. | 252—455 X |
| 2,529,283 | 11/1950 | Corner et al. | 252—455 |
| 2,908,635 | 10/1959 | Ogorzaly | 252—455 X |
| 3,003,951 | 10/1961 | Winyall | 252—453 X |

OSCAR R. VERTIZ, *Primary Examiner.*

MAURICE A. BRINDISI, *Examiner.*

E. J. MEROS, *Assistant Examiner.*